United States Patent
Findley

(10) Patent No.: US 9,943,979 B2
(45) Date of Patent: Apr. 17, 2018

(54) 3-D DIAMOND PRINTING USING A PRE-CERAMIC POLYMER WITH A NANOPARTICLE FILLER

(71) Applicant: Lockheed Martin Corporation, Bethesda, MD (US)

(72) Inventor: David G. Findley, Forth Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 191 days.

(21) Appl. No.: 15/090,289

(22) Filed: Apr. 4, 2016

(65) Prior Publication Data
US 2016/0214272 A1    Jul. 28, 2016

Related U.S. Application Data

(62) Division of application No. 14/201,450, filed on Mar. 7, 2014, now Pat. No. 9,302,945.

(51) Int. Cl.
*C04B 35/524* (2006.01)
*B28B 11/00* (2006.01)
(Continued)

(52) U.S. Cl.
CPC .............. *B28B 1/001* (2013.01); *B28B 11/00* (2013.01); *B32B 18/00* (2013.01); *C04B 35/52* (2013.01);
(Continued)

(58) Field of Classification Search
CPC ....... B28B 1/001; B28B 11/00; C04B 35/524; C04B 35/622; C04B 35/52;
(Continued)

(56) References Cited

U.S. PATENT DOCUMENTS 5,506,295 A   4/1996 Kado et al.
5,516,884 A   5/1996 Bianconi
(Continued)

FOREIGN PATENT DOCUMENTS

EP    1541321      6/2005
JP    2009209027   9/2009
(Continued)

OTHER PUBLICATIONS

M. Mott et al, "Solid Freeforming of Silicon Carbide by Inkjet Printing Using a Polymeric Precursor", Journal of the American Ceramic Society, Blackwell Publ., vol. 8, No. 2; Feb. 1, 2001 (Feb. 1, 2001), pp. 307-383, XP-001039143, ISSN: 0002-7820.
(Continued)

*Primary Examiner* — Nahida Sultana
(74) *Attorney, Agent, or Firm* — Baker Botts L.L.P.

(57) ABSTRACT

According to some embodiments, a method includes depositing alternating layers of a ceramic powder and a pre-ceramic polymer dissolved in a solvent. Each layer of the pre-ceramic polymer is deposited in a shape corresponding to a cross section of an object. The alternating layers of the ceramic powder and the pre-ceramic polymer are deposited until the layers of the pre-ceramic polymer form the shape of the object. The method includes heating the deposited ceramic powder and pre-ceramic polymer to at least a decomposition temperature of the pre-ceramic polymer. The decomposition temperature of the pre-ceramic polymer is less than a sintering temperature of the ceramic powder. The method further includes removing excess ceramic powder that the pre-ceramic polymer was not deposited onto.

20 Claims, 6 Drawing Sheets

(51) Int. Cl.
*B28B 1/00* (2006.01)
*B32B 18/00* (2006.01)
*C04B 35/52* (2006.01)
*C04B 35/622* (2006.01)
*B33Y 30/00* (2015.01)
*B33Y 70/00* (2015.01)

(52) U.S. Cl.
CPC .......... *C04B 35/524* (2013.01); *C04B 35/622* (2013.01); *B33Y 30/00* (2014.12); *B33Y 70/00* (2014.12); *C04B 2235/427* (2013.01); *C04B 2235/48* (2013.01); *C04B 2235/483* (2013.01); *C04B 2235/6026* (2013.01); *C04B 2237/363* (2013.01); *Y10T 428/30* (2015.01)

(58) Field of Classification Search
CPC ........ C04B 2235/427; C04B 2237/363; C04B 2235/48; C04B 2235/483; C04B 2235/6026; B32B 18/00; B33Y 70/00; B33Y 30/00; Y10T 428/30
See application file for complete search history.

(56) References Cited

U.S. PATENT DOCUMENTS

| | | | |
|---|---|---|---|
| 6,989,428 B1 | 1/2006 | Bianconi et al. | |
| 7,188,559 B1 | 3/2007 | Vecchio | |
| 7,625,956 B2 | 12/2009 | Odell et al. | |
| 8,013,109 B2 | 9/2011 | Toppare et al. | |
| 8,348,409 B2 | 1/2013 | Wu | |
| 8,491,964 B1 | 7/2013 | Morrell et al. | |
| 2001/0045678 A1* | 11/2001 | Kubo | B29C 41/36 264/37.29 |
| 2002/0090410 A1* | 7/2002 | Tochimoto | B29C 64/165 425/215 |
| 2002/0105114 A1* | 8/2002 | Kubo | B29C 64/153 264/497 |
| 2004/0010108 A1 | 1/2004 | Bianconi et al. | |
| 2006/0106184 A1 | 5/2006 | Bianconi et al. | |
| 2006/0115772 A1 | 6/2006 | Hah et al. | |
| 2008/0073126 A1 | 3/2008 | Shen et al. | |
| 2010/0055491 A1 | 3/2010 | Vecchio et al. | |
| 2010/0124611 A1 | 5/2010 | Mayo et al. | |
| 2013/0244121 A1 | 9/2013 | Gogotsi et al. | |

FOREIGN PATENT DOCUMENTS

| | | |
|---|---|---|
| WO | 2008086477 | 7/2008 |
| WO | 2008157550 | 12/2008 |
| WO | 2012103622 | 8/2012 |
| WO | 2013079618 | 6/2013 |

OTHER PUBLICATIONS

Bianconi et al., "Diamond and Diamond-Like Carbon from a Preceramic Polymer," J.A.M. Chem.Soc., 2004, vol. 126, pp. 3191-3202.

Pitcher et al., "The Formation of Smooth, Defect-free, Stoichiometric Silicon Carbide Films from a Polymeric Precursor", Mater Res. Soc. Symp. Proc. vol. 911 (2006).

Osipov et al., Rapid sintering of nano-diamond compacts, Diamond & Related Materials 18, 2009, pp. 1061-1064.

Chen, Yu-Chun et al., "Inkjet printing of nanodiamond suspensions in ethylene glycol for CVD growth of patterned diamond structures and practical applications," Diamond & Related Materials 18, 2009, pp. 146-150.

Mochalin et al., "The properties and applications of nanodiamonds," Nature Nanotechnology vol. 7, 2012, pp. 11-23.

Andrea Zocca et al., " SiOC ceramics with ordered porosity by 3D-printing of a preceramic polymer", [received Feb. 14, 2013; accepted Apr. 19, 2013] Journal of Materials Research, vol. 28, No. 17, Sep. 14, 2013, pp. 2243-2252, XP055201305, ISSN: 0884-2914, DOI: 10.1557/jmr.2013.129.

EPO Germany Communication re: partial European seach report (R. 64 EPC) for International Application/Patent No. 15157074.4-1351; Ref. EP98766JH900chb; dated Jul. 21, 2015.

EPO Germany Communication; extended European Search Report for International Application/Patent No. 15157074.4-1351; dated Nov. 27, 2015.

\* cited by examiner

Cross Section 310

Cross Section 320

3-D DIAMOND PRINTING USING A PRE-CERAMIC POLYMER WITH A NANOPARTICLE FILLER

RELATED APPLICATIONS

This application is a divisional of U.S. application Ser. No. 14/201,450 filed Mar. 7, 2014 and entitled "3-D Diamond Printing Using a Pre-Ceramic Polymer with Nanoparticle Filler".

TECHNICAL FIELD OF THE INVENTION

This invention relates generally to three-dimensional (3-D) printing and in particular to 3-D printing using a pre-ceramic polymer with a ceramic powder filler.

BACKGROUND

Three-dimensional (3-D) printing is an additive manufacturing process that allows for the manufacture of objects by "building up" an object. In contrast to subtractive techniques, such as machining, in which material is removed from a bulk material in order to form the shape of an object, 3-D printing lays down successive layers of material to form the shape of an object. Typical materials used for 3-D printing may include plastics, ceramics, and metals.

SUMMARY

According to some embodiments, a method includes depositing alternating layers of a ceramic powder and a pre-ceramic polymer dissolved in a solvent. Each layer of the pre-ceramic polymer is deposited in a shape corresponding to a cross section of an object. The alternating layers of the ceramic powder and the pre-ceramic polymer are deposited until the layers of the pre-ceramic polymer form the shape of the object. The method includes heating the deposited ceramic powder and pre-ceramic polymer to at least a decomposition temperature of the pre-ceramic polymer. The decomposition temperature of the pre-ceramic polymer is less than a sintering temperature of the ceramic powder. The method further includes removing excess ceramic powder that the pre-ceramic polymer was not deposited onto.

Technical advantages of certain embodiments may include using a diamond forming pre-ceramic polymer in a 3-D printer to form a diamond object. Some embodiments may provide methods of forming an object by depositing layers of multiple types of pre-ceramic polymers and multiple types of ceramic powders. Additional technical advantages of some embodiments may include use of ceramic powders that can be left in place to provide support for an object during heating. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Diamond is a form of the element carbon that has many unique properties. Diamond is among the hardest known materials, has a high melting and boiling point, and is an excellent thermal conductor as well as electrical insulator. Objects made out of diamond may be able to take advantage of these properties. For example, tools made out of diamond, such as drill bits, saws, or knives, may be more durable than tools made of conventional materials due to the hardness of diamond. Diamond can be produced in a variety of ways including as a powder in the form of diamond nanoparticles and from the pyrolysis of a pre-ceramic polymer.

The teachings of the disclosure recognize that using three-dimensional (3-D) printing techniques with a pre-ceramic polymer and nanoparticle powder may allow for the creation of objects made of a variety of ceramics in a variety of useful shapes. In particular, using 3-D printing techniques with a diamond forming pre-ceramic polymer and a diamond nanoparticle powder may allow for the creation of diamond objects in a variety of shapes. For example, using 3-D printing with a diamond forming pre-ceramic polymer and a diamond nanoparticle powder, a diamond drill bit having almost any geometry could be printed. As other examples, 3-D printing with a diamond forming pre-ceramic polymer and a diamond nanoparticle powder may be used to print brake pad inserts, avionics boxes, lightweight armor, diamond dialysis filters, vacuum micro-electronics, or any other appropriate object. Furthermore, by using different pre-ceramic polymers and nanoparticle powders separately or in addition to diamond forming pre-ceramic polymer and diamond nanoparticle powder, the properties of a printed object could be varied to meet various design objectives. Further, the teachings of this disclosure recognize that a nanoparticle powder that does not sinter may be used to support an object during the 3-D printing process. The following describes methods and systems of 3-D printing using a pre-ceramic polymer with a nanoparticle filler.

Figure 1:
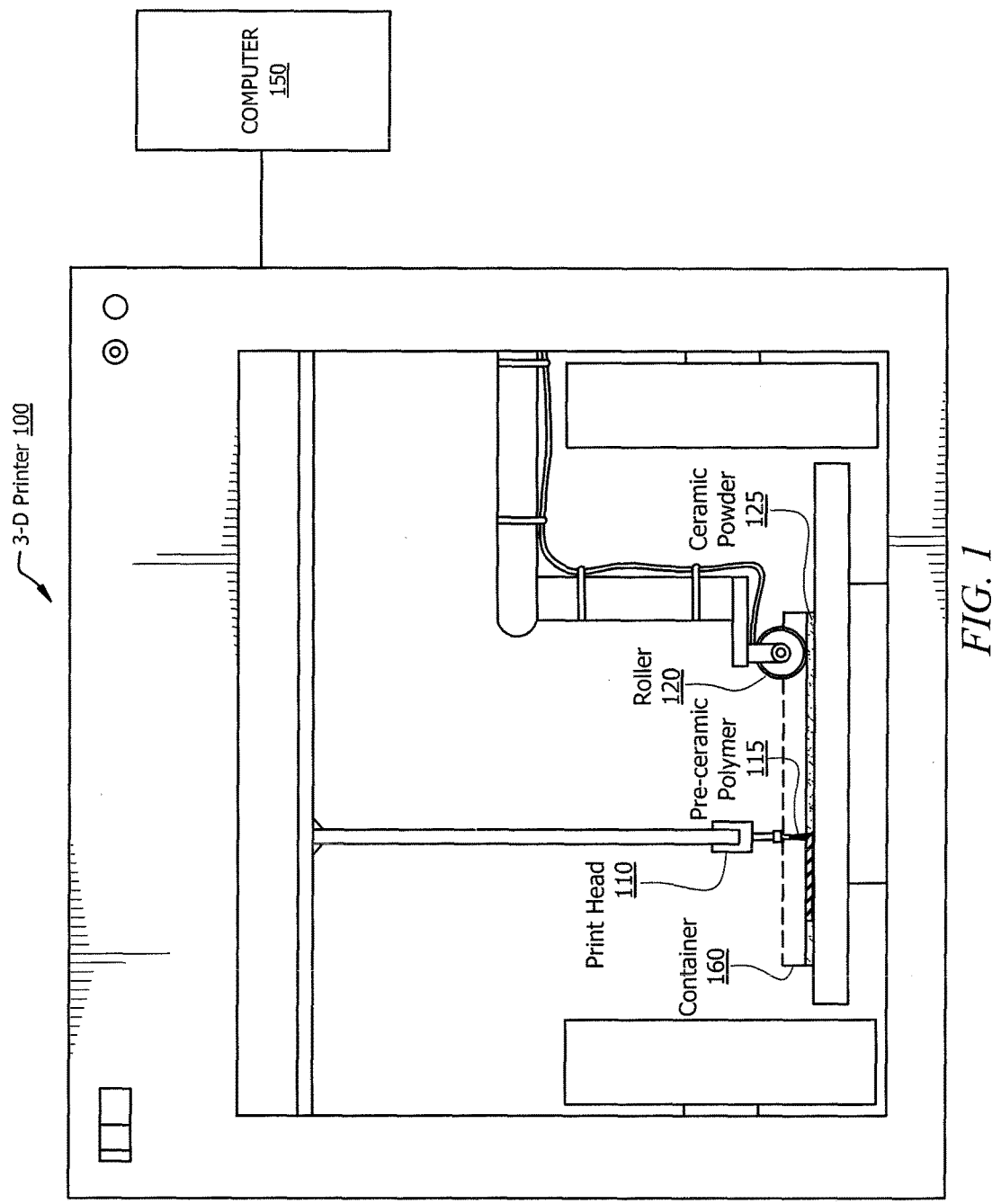
FIG. 1 illustrates an example of a 3-D printer, according to certain embodiments.

FIG. 1 illustrates an example embodiment of a 3-D printer 100. 3-D printer 100 includes a print head 110 and a roller 120. Roller 120 deposits layers of a ceramic powder 125 into a container 160. Print head 110 deposits a pre-ceramic polymer 115 dissolved in a solvent onto the layers of ceramic powder 125. In some embodiments, 3-D printer 100 may include a computer system 150 that controls the printing of an object by providing instructions to 3-D printer 100. Computer system 150 may be either external to 3-D printer 100 or incorporated into 3-D printer 100. Certain embodiments of computer system are discussed in more detail below with respect to FIG. 7.

In general, certain embodiments of 3-D printer 100 print 3-D diamond objects using roller 120 and print head 110. For example, 3-D printer 100 may print the 3-D object 200 illustrated in FIG. 2 by depositing successive layers of pre-ceramic polymer 115 through print head 110 onto layers of ceramic powder 125 that were deposited by roller 120 into container 160. Specifically, roller 120 may initially deposit a first layer of ceramic powder 125 into container 160. Print head 110 may then deposit a first layer of pre-ceramic polymer 115 onto the first layer of ceramic powder 125 in the shape of a first cross section or "slice" of the desired 3-D object. After a certain amount of time, roller 120 may then deposit a second layer of ceramic powder 125 on top of the first layer of ceramic powder 125 and first layer of pre-ceramic polymer 115. In some embodiments, the certain amount of time may be sufficient to allow for solvent to evaporate. Print head 110 may then deposit a second layer of pre-ceramic polymer 115 onto the second layer of ceramic powder 125 in the shape of a cross section of the object that is adjacent to and above the first cross section. Subsequent layers of ceramic powder 125 and pre-ceramic polymer 115 may be deposited in alternating fashion until the layers of pre-ceramic polymer 115 form the shape of the desired 3-D object.

Once all layers of pre-ceramic polymer 115 and ceramic powder 125 have been deposited in container 160 to form the shape of the desired 3-D object within ceramic powder 125, container 160 may then be placed into a furnace for baking. In some embodiments, baking may take place in an inert atmosphere. Unlike other methods in which excess powder may be removed prior to baking, excess ceramic powder 125 (i.e., ceramic powder 125 that was not sprayed with any pre-ceramic polymer 115) is not removed prior to baking but instead remains within container 160 during the baking process. This may provide additional advantages to prior processes by providing support for the 3-D object during baking. Once the baking is complete and after cooling, excess ceramic powder 125 is removed in order to reveal the desired 3-D diamond object. The excess ceramic powder 125 may then be recycled and reused or discarded.

Print head 110 may be any commercially-available print head such as any ink jet or any aerosol jet print head. Depending on the type of print head 110 used, different feature sizes may be printed for an object. For example, an aerosol jet print head 110 may allow features as small as 10 microns to be printed. Print head 110 may be able to precisely control the volume of pre-ceramic polymer 115 deposited to ensure that pre-ceramic polymer 115 does not "soak through" the most recent layer of ceramic powder 125 into previously deposited layers of ceramic powder 125. While specific embodiments of print head 110 have been described, any appropriate system or method of depositing pre-ceramic polymer 115 onto ceramic powder 125 may be utilized. For example, certain embodiments of 3-D printer 100 may utilize techniques to deposit pre-ceramic polymer 115 onto ceramic powder 125 that do not involve any form of print head 110.

Roller 120 may be any device operable to deposit layers of ceramic powder 125. For example, roller 120 may be a roller that is fed by a hopper of ceramic powder 125. In alternative embodiments, roller 120 may be a nozzle that is able to uniformly deposit layers of ceramic powder 125. While specific systems of depositing ceramic powder 125 have been described, any appropriate system or method of depositing layers of ceramic powder 125 may be utilized. For example, certain embodiments of 3-D printer 100 may utilize techniques to deposit layers of ceramic powder 125 that do not involve any form of roller 120.

In some embodiments, pre-ceramic polymer 115 may be poly(hydridocarbyne) ("PHC"), poly(methylsilyne) ("PMS"), or any sp3-hybridized polymer. Pre-ceramic polymer 115 may react with itself (e.g. pyrolyze, thermolyze, or decompose) to form a ceramic above a certain temperature known as a decomposition, or pyrolysis, temperature of pre-ceramic polymer 115. In some embodiments, pre-ceramic polymer 115 may be dissolved in a solvent such as acetone, tetra hydrofuran, toluene, acetonitrile, an aprotic solvent, a mixture of any two or more of these solvents, and the like.

In some embodiments, after depositing a layer of pre-ceramic polymer 115 dissolved in a solvent, 3-D printer 100 may pause for a predetermined amount of time to allow the solvent to evaporate before depositing another layer of ceramic powder 125. Because layers of pre-ceramic polymer 115 may be relatively thin in certain embodiments, a pause of several seconds or less may be sufficient to allow the solvent to evaporate. Allowing the solvent to evaporate after each layer of pre-ceramic polymer 115 is deposited may prevent the solvent from becoming entrained in ceramic powder 125 as subsequent layers of ceramic powder 125 and pre-ceramic polymer 115 are deposited. This may prevent any graphitic contaminate from forming within any 3-D printed object.

Ceramic powder 125 may be any appropriate nanoparticle filler. In some embodiments, ceramic powder 125 may be any one or a mixture of the following: detonation nanodiamond ("DND") powder, silicon carbide powder, graphene nano-platelet powder, graphene oxide nano-platelet powder, carbon nanotube powder, various fullerenes (such as Buckminsterfullerenes), boron nitride nano-platelet powder, a carbide forming metal powder, or any other powder that will not sinter at the decomposition temperature of pre-ceramic polymer 115. Examples of carbide forming metals include, but are not limited to, titanium, hafnium, and tungsten. In some embodiments, an average particle diameter of ceramic powder 125 may be less than a colloidal particle diameter of pre-ceramic polymer 115. In some embodiments, the average particle diameter of ceramic powder 125 may be less than 30 nanometers. One example of a possible ceramic powder 125, DND, may be formed by the detonation of explosives in an enclosed chamber in an inert atmosphere. The resulting nanodiamonds may have a diameter between 2 and 20 nanometers. Through processing, a powder of nanodiamonds having diameters of to 5 nanometers may be created. Detonation nanodiamonds have a cubic crystal structure, like that of most naturally occurring diamond.

In some embodiments, 3-D printer 100 may be controlled by computer system 150. Computer system 150 may be any suitable computer system in any suitable physical form. In general, computer system 150 may store a digital representation of a 3-D object and provide 3-D printer 100 with information to print the 3-D object. For example, computer system 150 may store a 3-D computer aided design (CAD) model of an object and provide the model to 3-D printer 100 when printing the object.

Computer system 150 may be integrated into 3-D printer 100, connected to 3-D printer 100, or be multiple computer systems both integrated into 3-D printer 100 and separate from 3-D printer 100. As an example and not by way of limitation, computer system 150 may be a virtual machine (VM), an embedded computer system, a system-on-chip (SOC), a single-board computer system (SBC) (e.g., a computer-on-module (COM or a system-on-module (SOM)), a desktop computer system, a laptop or notebook computer system, a mainframe, a mesh of computer systems, a server, an application server, or a combination of two or more of these. Where appropriate, computer system 150 may include one or more computer systems 150; be unitary or distributed; span multiple locations; span multiple machines; or reside in a cloud, which may include one or more cloud components in one or more networks. Where appropriate, one or more computer systems 150 may perform without substantial spatial or temporal limitation one or more steps of one or more methods described or illustrated herein. As an example and not by way of limitation, one or more computer systems 150 may perform in real time or in batch mode one or more steps of one or more methods described or illustrated herein. One or more computer systems 150 may perform at different times or at different locations one or more steps of one or more methods described or illustrated herein, where appropriate. A particular embodiment of computer system 150 is described in more detail below in reference to FIG. 7.

Figure 2:
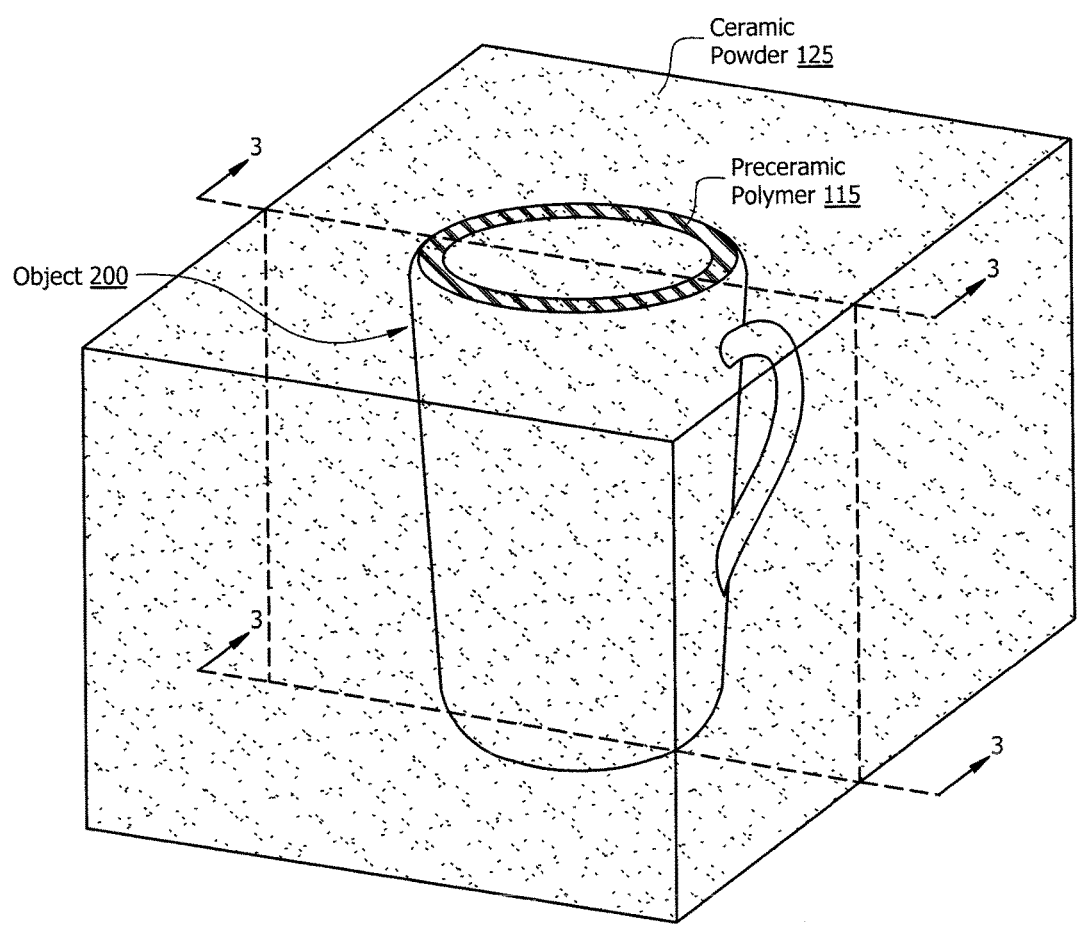
FIG. 2 illustrates an object printed by the 3-D printer of FIG. 1 within ceramic powder, according to certain embodiments.

FIG. 2 illustrates an example of a 3-D printed object 200 printed by 3-D printer 100 within excess ceramic powder 125. When all layers of ceramic powder 125 and pre-ceramic polymer 115 have been deposited, the volume of ceramic powder 125 onto which pre-ceramic polymer 115 was deposited will be in the shape of object 200 within ceramic powder 125. Pre-ceramic polymer 115 may act as a binder, binding ceramic powder 125 together in the areas where print head 110 deposited pre-ceramic polymer 115. The remaining excess ceramic powder 125 may act as a support for the object. For example, the excess ceramic powder 125 may keep thin sections of object 200 from collapsing.

Figure 3:
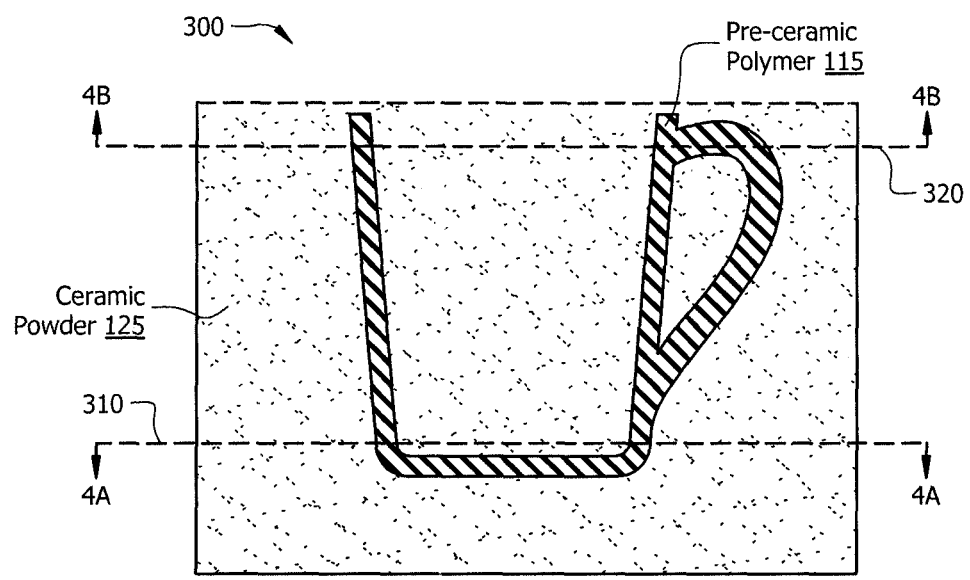
FIG. 3 illustrates a vertical cross section of the 3-D printed object illustrated in FIG. 2, according to certain embodiments.
Figure 4A:
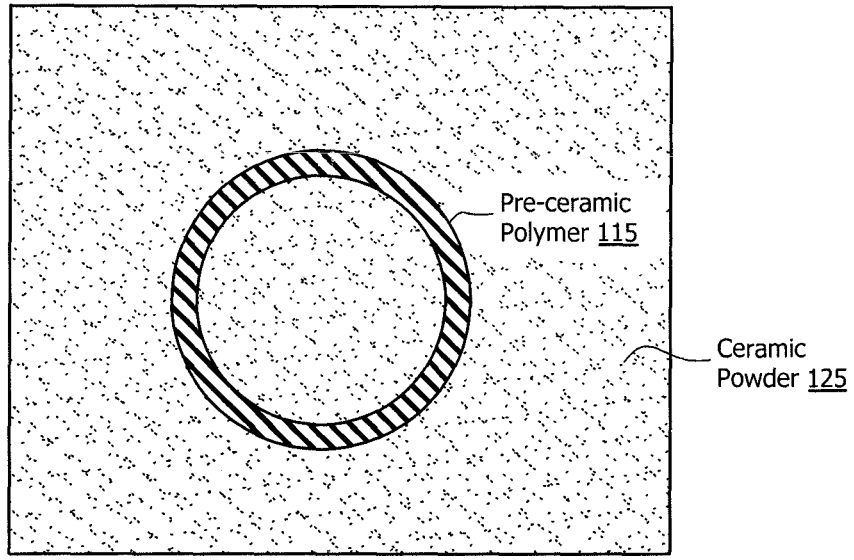
FIGS. 4A and 4B illustrate horizontal cross sections of the 3-D printed object illustrated in FIG. 2, according to certain embodiments.
Figure 4B:
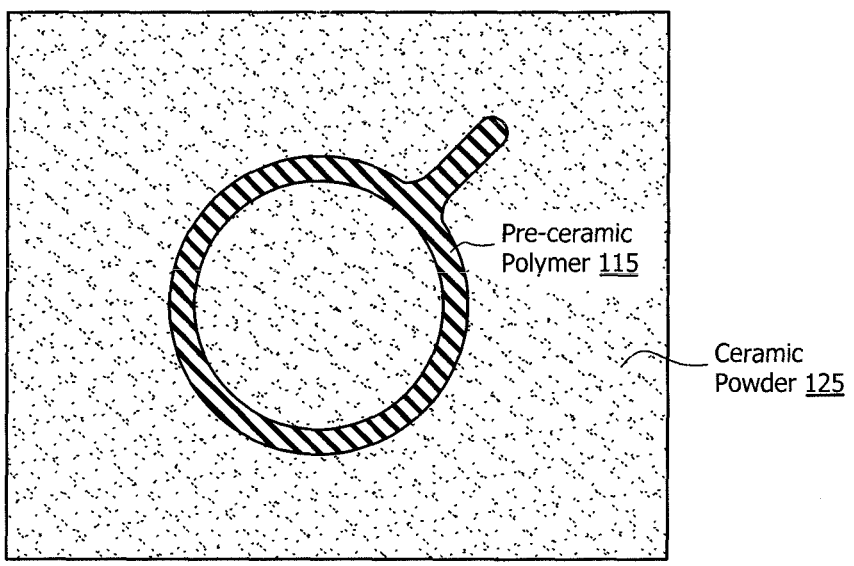

FIG. 3 illustrates an example of a vertical cross section 300 of 3-D printed object 200 illustrated in FIG. 2. Vertical cross section 300 illustrates how a pattern of pre-ceramic polymer 115, when deposited onto subsequent layers of ceramic powder 125, forms the shape of object 200. FIG. 3 also includes horizontal cross sections 310 and 320, which are illustrated in FIGS. 4A and 4B. Horizontal cross section 310 corresponds to a horizontal cross section of pre-ceramic polymer 115 that may be deposited near the bottom of object 200 illustrated in FIG. 2. Horizontal cross section 320 corresponds to a horizontal cross section of pre-ceramic polymer 115 that may be deposited near the top of object 200 illustrated in FIG. 2.

Figure 5A:
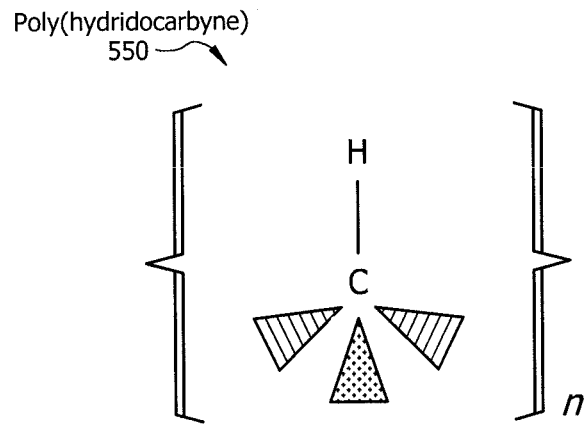
FIG. 5A illustrates the chemical structure of the pre-ceramic polymer poly(hydridocarbyne)

FIG. 5A illustrates the chemical structure of poly(hydridocarbyne), which may be used for pre-ceramic polymer 115 in some embodiments. Poly-(hydridocarbyne) may pyrolyze to form diamond-like carbon or polycrystalline diamond when heated to a decomposition temperature such as between about 100 degrees Celsius and 800 degrees Celsius in an inert atmosphere. Upon sustained heating at or above the decomposition temperature for a predetermined amount of time (e.g., 12 to 24 hours), diamond-like carbon may anneal to form polycrystalline diamond. Diamond formed by pyrolysis of poly(hydridocarbyne) may have a hexagonal crystal structure. Diamond having a hexagonal crystal structure is also known as lonsdaleite. At its pyrolysis temperature, poly(hydridocarbyne) may react with the surface of ceramic powder 125 and bond to it. For example, if ceramic powder 125 is comprised of DND, poly(hydridocarbyne) may react to form polycrystalline diamond bonded to the DND. As a result, after heating, the 3-D printed object will be composed of polycrystalline diamond. More specifically, the object may be composed of cubic crystal structure DND bonded within polycrystalline hexagonal diamond. By 3-D printing using DND and poly(hydridocarbyne), objects comprised entirely of solid diamond may be printed in almost any shape. For example, drill heads used for boring through the earth, such as drill heads with complex geometries that are used in the oil industry, could be printed using DND and poly(hydridocarbyne) to form a polycrystalline diamond drill head.

If a carbide-forming metal powder is used as ceramic powder 125, the poly(hydridocarbyne) may react with the surface of the metal particles to form metal carbide bonds. For example, if tungsten powder is used as ceramic powder 125, the 3-D printed object after heating may comprise tungsten particles suspended in polycrystalline diamond, with the polycrystalline diamond bonded to the surface of the tungsten particles by tungsten carbide bonds.

Figure 5B:
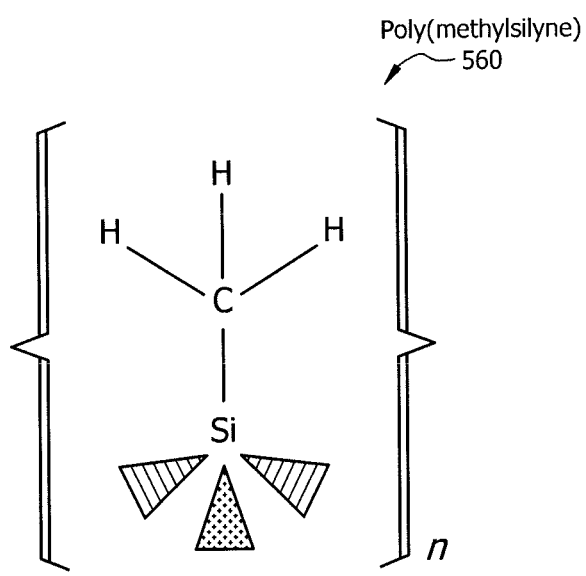
FIG. 5B illustrates the chemical structure of the pre-ceramic polymer poly(methylsilyne)

FIG. 5B illustrates the chemical structure of poly(methylsilyne), which may be used for pre-ceramic polymer 115 in some embodiments. Poly(methylsilyne) may pyrolyze to form silicon carbide when heated to a decomposition temperature such as between about 100 degrees Celsius and 800 degrees Celsius. At its pyrolysis temperature, poly(methylsilyne) may react with the surface of ceramic powder 125 and bond to it. For example, if ceramic powder 125 is comprised of DND, poly(methylsilyne) may react to form silicon carbide bonded to the DND. As a result, after heating, the 3-D printed object may be composed of cubic crystal structure detonation nanodiamonds within silicon carbide, with the silicon carbide bonded to the surface of the detonation nanodiamonds. If the ceramic powder comprises silicon carbide powder, poly(methylsilyne) will react to form silicon carbide bonded to the silicon carbide powder, forming a 3-D object of polycrystalline silicon carbide.

In operation of example embodiments, 3-D printer 100 may print object 200 by depositing alternating layers of ceramic powder 125 and pre-ceramic polymer 115. 3-D printer 100 may deposit pre-ceramic polymer 115 in the shape of cross sections of the object being printed, such as those illustrated in FIGS. 4A and 4B. In some embodiments, the 3-D printing of object 200 using pre-ceramic polymer 115 and ceramic powder 125 may take place in an inert atmosphere. Examples of inert gases include, but are not limited to, argon, nitrogen, neon, xenon, and the like. Depositing layers of pre-ceramic polymer 115 and ceramic powder 125 in an inert atmosphere prevents oxygen from becoming entrained in object 200 and in excess ceramic powder 125 in which print head 110 did not deposit pre-ceramic polymer 115.

After 3-D printer 100 deposits all layers of ceramic powder 125 and pre-ceramic polymer 115, object 200 and excess ceramic powder 125 may be baked to a temperature at or above the decomposition temperature of pre-ceramic polymer 115 and below the sintering temperature of ceramic powder 125. In some embodiments, this temperature range may be between about 100 degrees Celsius and 800 degrees Celsius. In certain embodiments, 3-D printer 100 may incorporate a heater or oven to bake the printed layers of pre-ceramic polymer 115 and ceramic powder 125. In an alternative embodiment, the printed layers of pre-ceramic polymer 115 and ceramic powder 125 may be moved to an oven for baking after printing. For example, the layers of pre-ceramic polymer 115 and ceramic powder 125 may be deposited in container 160 in some embodiments and container 160 may be moved to an oven for baking after printing.

In some embodiments, the baking occurs at any temperature in which ceramic powder 125 may remain a powder and pre-ceramic polymer 115 decomposes. For example, the baking may occur at a decomposition temperature that is between about 100 degrees Celsius and about 800 degrees Celsius. For example, the baking may occur at a temperature that is at least 100 degrees Celsius, plus or minus 0%-1%, 1%-5%, 5%-10%, or 10%-20%, but is less than 800 degrees Celsius, plus or minus 0%-1%, 1%-5%, 5%-10%, or 10%-20%. While specific baking temperatures have been disclosed, it should be noted that any appropriate temperature in which ceramic powder 125 remains a powder (i.e. any temperature at which ceramic powder 125 does not sinter to itself) while pre-ceramic polymer 115 decomposes may be utilized.

In some embodiments, the baking occurs in an inert atmosphere such as nitrogen, argon, xenon, neon, and the like. Baking in an inert atmosphere may prevent the printed pre-ceramic polymer 115 and ceramic powder 125 from reacting with any oxygen in the air. In some embodiments, if 3-D printer 100 printed an object in the presence of oxygen, the oxygen may additionally or alternatively be purged from the printed pre-ceramic polymer 115 and ceramic powder 125 before baking. To remove entrained oxygen before baking, the printed pre-ceramic polymer 115 and ceramic powder 125 may be placed in a vacuum or inert atmosphere to allow the oxygen to diffuse out. Removal of entrained oxygen may take an extended period of time (e.g., up to twenty four hours). Given the amount of time required to purge oxygen from the printed pre-ceramic polymer 115 and ceramic powder 125, 3-D printing in an inert atmosphere may be desirable in order to expedite the 3-D printing process.

As mentioned above, the decomposition temperature may be between about 100 degrees Celsius and about 800 degrees Celsius. Pre-ceramic polymer 115 may react with itself and with the surface of particles of ceramic powder 125 at this temperature. In this temperature range, particles of ceramic powder 125 will not sinter, meaning they will not react with, or bind to, other particles of ceramic powder 125. Therefore, ceramic powder 125 may remain a powder at the temperatures at which pre-ceramic polymer 115 decomposes. The excess ceramic powder 125 that is not in contact with pre-ceramic polymer 115 may act as a support for the printed object during heating.

After heating the ceramic powder 125 containing pre-ceramic polymer 115, excess ceramic powder may be removed from the object. The excess ceramic powder may be recycled and used to print another 3-D object. 3-D printer 100 may remove excess ceramic powder 125 from the 3-D diamond object using a brush, vacuum, compressed air, or any other appropriate tool. Excess ceramic powder 125 may also be removed manually after heating.

In some embodiments, 3-D printer 100 may be able to print a layer of ceramic powder 125 and a layer of pre-ceramic polymer 115 continuously. In such an embodiment, 3-D printer 100 may have multiple rollers 120 and print heads 110 in order to print multiple layers continuously. Multiple rollers 120 and print heads 110 may be arranged sequentially on a moving line which feeds directly into a heater or oven to heat the printed layers. In such an embodiment, the printed object may be a thin continuous object, such as a printed cloth that can be rolled upon exit from the oven.

In some embodiments, 3-D printer 100 may print object 200 using multiple ceramic powders 125 and pre-ceramic polymers 115. The use of different ceramic powders 125 may produce objects having different properties. Properties that may depend on the choice of ceramic powders 125 include toughness, hardness, yield strength, density, friction, electrical conductivity, thermal conductivity, thermal expansion coefficient, optical transparence, index of refraction, or other physical properties, in a printed object. For example, printing an object using carbon nanotube powder may result in an object that is tougher than one printed using DND, while objects printed using DND may be harder than those printed using carbon nanotube powder.

In some embodiments, certain ceramic powders 125 may also be mixed to tune the desired properties of object 200. For example, a mixture of carbon nanotubes and DND may be used as ceramic powder 125 to create an object 200 having desired levels of toughness and hardness. Additionally, roller 120 may deposit layers of different ceramic powders 125. For example, roller 120 may deposit a first layer of DND, followed by a layer of Buckminsterfullerenes. Depositing layers of different ceramic powers 125 allows the printing of an object with desirable properties. For example, printing an object with layers that alternate between being hard and being tough may allow for the creation of an object with properties desirable as an armor. As one example, an armor having alternating layers of diamond and metal carbide may be printed.

In some embodiments, print head 110 may deposit both poly(hydridocarbyne) and poly(methylsilyne) to print object 200. For example, poly(hydridocarbyne) could be used to print some layers of an object and poly(methylsilyne) could be used to print other layers of the object. Similarly, poly(hydridocarbyne) could be used to print a section of an object and poly(methylsilyne) could be used to print another section. For example, poly(hydridocarbyne) could be used to print the handle portion of object 200 illustrated in FIG. 2 and poly(methylsilyne) could be used to print the cup portion of object 200. In some embodiments, poly(hydridocarbyne) could be printed onto a layer of a first type of ceramic powder 125 and poly(methylsilyne) could be printed onto a layer of a second type of ceramic powder 125. Printing objects 200 using multiple types of ceramic powders 125 and both poly(methylsilyne) and poly(hydridocarbyne) may allow for the creation of objects that would be otherwise difficult to manufacture. For example, a missile radome could be printed out of diamond with a silicon carbide coating to prevent oxidation of the diamond at high temperatures. Such an object could be printed by using layers of DND and poly(hydridocarbyne) to form the structure of the radome, and using silicon carbide powder and poly(methylsilyne) to form the outer surface of the radome.

Figure 6:
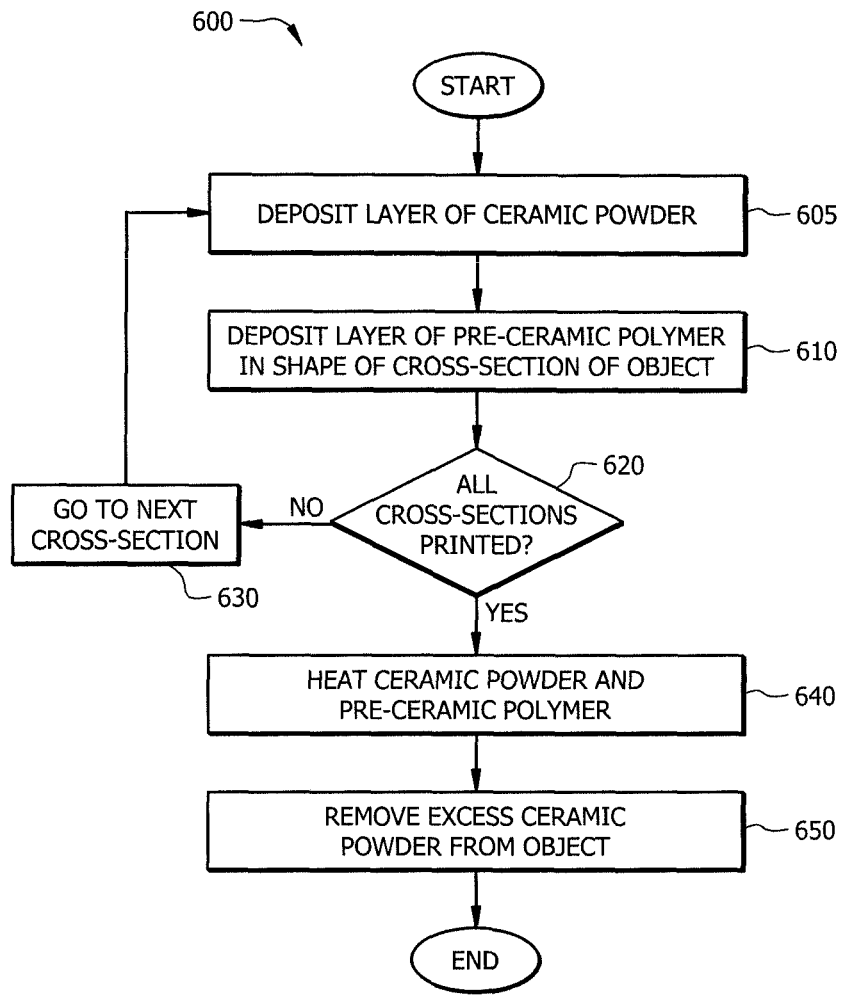
FIG. 6 illustrates a method of printing a 3-D object in a ceramic powder using a pre-ceramic polymer, according to certain embodiments.

FIG. 6 illustrates a method 600 for printing a 3-D object such as object 200 in a ceramic powder using a pre-ceramic polymer. Method 600 may be implemented by 3-D printer 100. Method 600 begins at step 605 where a layer of ceramic powder is deposited. In some embodiments, the layer of ceramic powder is deposited by an apparatus such as roller 120 or any other suitable method. In some embodiments, the ceramic powder deposited in step 605 may be ceramic powder 125 discussed above. In some embodiments, the ceramic powder may be deposited into a container such as container 160 above.

At step 610, a layer of pre-ceramic polymer is deposited in the shape of a cross section of the desired object onto the layer of ceramic powder deposited in step 605. In some embodiments, the pre-ceramic polymer is deposited in step 610 by print head 110 or any other appropriate apparatus. In some embodiments, the pre-ceramic polymer is pre-ceramic polymer 115 above. After depositing the pre-ceramic polymer in step 610, some embodiments of method 600 may pause to allow any solvent within the pre-ceramic polymer to evaporate.

At step 620, all layers of pre-ceramic polymer needed to form the object have not been deposited, 3-D printer 100 will select the next cross section to be printed and move back to step 605 where a new layer of ceramic powder is deposited. At step 610, pre-ceramic polymer 115 is deposited in the shape of the next cross section of the object. When all cross sections have been printed, method 600 proceeds to step 640.

At step 640, the printed ceramic powder and pre-ceramic polymer is heated at or above the pre-ceramic polymer's decomposition temperature. At this temperature, the pre-ceramic polymer may react to form a ceramic and may bind to the ceramic powder. In some embodiments, step 640 occurs in an inert atmosphere as described above.

After heating in step 640, some embodiments of method 600 proceed to step 650 where excess ceramic powder that is not in contact with the reacted pre-ceramic polymer is removed. In some embodiments, the excess powder may be either removed mechanically (e.g., by 3-D printer 100) or manually removed. In some embodiments, the excess ceramic powder is recycled or discarded.

After printing, heating, and removal of excess ceramic powder, the object may be subjected to additional processing steps to prepare the object for use. Examples of post-printing processing may include: painting the object, polishing the object, treating the surface of the object to render it chemically inert or to make it chemically active, and assembly of another object or device from multiple printed objects.

Figure 7:
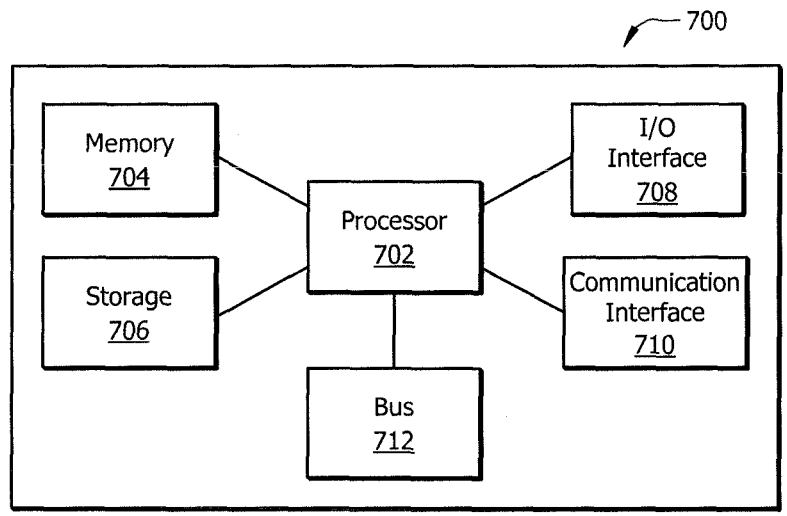
FIG. 7 illustrates an example computer system that may used to control the 3-D printer of FIG. 1, according to certain embodiments.

FIG. 7 illustrates an example computer system 700. Computer system 700 may be utilized by computer system 150 of FIG. 1. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700.

As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

The components of computer system 700 may be integrated or separated. In some embodiments, components of computer system 700 may each be housed within a single chassis. The operations of computer system 700 may be performed by more, fewer, or other components. Additionally, operations of computer system 700 may be performed using any suitable logic that may comprise software, hardware, other logic, or any suitable combination of the preceding.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus comprising:
   a roller adapted to deposit layers of a detonation nanodiamond powder in an inert atmosphere;
   a print head adapted to deposit layers of pre-ceramic polymers comprising: poly(hydridocarbyne) dissolved in a solvent in shapes corresponding to cross sections of an object in an inert atmosphere, wherein;
      the roller and the print head alternately deposit layers of the detonation nanodiamond powder and the pre-ceramic polymer until the layers of the pre-ceramic polymer form the shape of the object;
   a heater operable to heat the deposited detonation nanodiamond powder and poly(hydridocarbyne), in an inert atmosphere, to a temperature sufficient to cause the poly(hydridocarbyne) to form polycrystalline diamond; and
   a tool for removing excess detonation nanodiamond powder that the pre-ceramic polymer was not deposited onto.

2. The apparatus of claim 1, wherein the solvent comprises one or more of acetone, tetra hydrofuran, toluene, or acetonitrile.

3. The apparatus of claim 1, wherein the deposited detonation nanodiamond powder and poly(hydridocarbyne) is heated to temperature of at least 100 degrees Celsius and less than or equal to 800 degrees Celsius.

4. The apparatus of claim 1, wherein the roller waits for the solvent to evaporate after a layer of poly(hydridocarbyne) is deposited before depositing a subsequent layer of detonation nanodiamond powder.

5. The apparatus of claim 1, wherein an average diameter of particles of the detonation nanodiamond powder is less than or equal to 30 nanometers.

6. An apparatus comprising:
   a roller adapted to deposit layers of a ceramic powder;
   a print head adapted to deposit layers of a pre-ceramic polymer dissolved in a solvent in shapes corresponding to cross sections of an object, wherein;
      the roller and the print head alternately deposit layers of the ceramic powder and the pre-ceramic polymer until the layers of the pre-ceramic polymer form the shape of the object;
   a heater operable to heat the deposited ceramic powder and pre-ceramic polymer to at least a decomposition temperature of the pre-ceramic polymer, wherein the decomposition temperature of the pre-ceramic polymer is less than a sintering temperature of the ceramic powder; and
   a tool for removing excess ceramic powder that the pre-ceramic polymer was not deposited onto.

7. The apparatus of claim 6, wherein the pre-ceramic polymer is one of poly(hydridocarbyne) or poly(methylsilyne).

8. The apparatus of claim 6, wherein the solvent comprises one or more of acetone, tetra hydrofuran, toluene, or acetonitrile.

9. The apparatus of claim 6, wherein the ceramic powder comprises one or more of detonation nanodiamond powder, silicon carbide powder, graphene nano-platlet powder, graphene oxide nano-platelet powder, carbon nanotube powder, fullerene powder, boron nitride nano-platelet powder, or a carbide forming metal powder.

10. The apparatus of claim 6, wherein the deposited ceramic powder and pre-ceramic polymer is heated to temperature of at least 100 degrees Celsius and less than or equal to 800 degrees Celsius in an inert atmosphere.

11. The apparatus of claim 6, wherein the roller waits for the solvent to evaporate after a layer of pre-ceramic polymer is deposited before depositing a subsequent layer of ceramic powder.

12. The apparatus of claim 6, wherein the apparatus further comprises a vacuum operable to draw a vacuum on the deposited ceramic powder and pre-ceramic polymer before heating.

13. The apparatus of claim 6, wherein an average diameter of particles of the ceramic powder is less than or equal to 30 nanometers.

14. An apparatus comprising:
   a roller adapted to deposit layers of a ceramic powder in an inert atmosphere;
   a print head adapted to deposit layers of a pre-ceramic polymer dissolved in a solvent in shapes corresponding to cross sections of an object in an inert atmosphere, wherein;
      the roller and the print head alternately deposit layers of the ceramic powder and the pre-ceramic polymer until the layers of the pre-ceramic polymer form the shape of the object;
   a heater operable to heat the deposited ceramic powder and pre-ceramic polymer to at least a decomposition temperature of the pre-ceramic polymer in an inert atmosphere, wherein the decomposition temperature of the pre-ceramic polymer is less than a sintering temperature of the ceramic powder; and
   a tool for removing excess ceramic powder that the pre-ceramic polymer was not deposited onto.

15. The apparatus of claim 14, wherein the pre-ceramic polymer is one of poly(hydridocarbyne) or poly(methylsilyne).

16. The apparatus of claim 14, wherein the solvent comprises one or more of acetone, tetra hydrofuran, toluene, or acetonitrile.

17. The apparatus of claim 14, wherein the ceramic powder comprises one or more of detonation nanodiamond powder, silicon carbide powder, graphene nano-platlet powder, graphene oxide nano-platelet powder, carbon nanotube powder, fullerene powder, boron nitride nano-platelet powder, or a carbide forming metal powder.

18. The apparatus of claim 14, wherein the deposited ceramic powder and pre-ceramic polymer is heated to temperature of at least 100 degrees Celsius and less than or equal to 800 degrees Celsius.

19. The apparatus of claim 14, wherein the roller waits for the solvent to evaporate after a layer of pre-ceramic polymer is deposited before depositing a subsequent layer of ceramic powder.

20. The apparatus of claim 14, wherein an average diameter of particles of the ceramic powder is less than or equal to 30 nanometers.

* * * * *